United States Patent
Ishikawa

(10) Patent No.: US 8,416,654 B2
(45) Date of Patent: Apr. 9, 2013

(54) OPTICAL DISC DRIVE APPARATUS, OPTICAL PICKUP CONTROL METHOD AND PROGRAM

(75) Inventor: Hideki Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 12/965,166

(22) Filed: Dec. 10, 2010

(65) Prior Publication Data

US 2011/0149702 A1  Jun. 23, 2011

(30) Foreign Application Priority Data

Dec. 22, 2009 (JP) ................... P2009-290694

(51) Int. Cl.
*G11B 7/00* (2006.01)

(52) U.S. Cl.
USPC .................... 369/44.11; 369/44.27

(58) Field of Classification Search ........... 369/44.11, 369/44.27
See application file for complete search history.

(56) References Cited

U.S. PATENT DOCUMENTS

| 2005/0162990 A1* | 7/2005 | Murata ............... 369/30.23 |
| 2009/0316556 A1* | 12/2009 | Suzuki ............... 369/53.42 |
| 2011/0134729 A1* | 6/2011 | Ishimoto ............. 369/44.11 |
| 2011/0242953 A1* | 10/2011 | Mahnad .............. 369/53.11 |
| 2011/0242958 A1* | 10/2011 | Shi et al. ............ 369/103 |

FOREIGN PATENT DOCUMENTS

| JP | 11096668 A | * | 4/1999 |
| JP | 11296868 A | * | 10/1999 |
| JP | 2000090551 A | * | 3/2000 |
| JP | 2006-268952 | | 10/2006 |

* cited by examiner

*Primary Examiner* — Wayne Young
*Assistant Examiner* — Brenda Bernardi
(74) *Attorney, Agent, or Firm* — Finnegan, Henderson, Farabow, Garrett & Dunner, LLP

(57) ABSTRACT

An optical disc drive apparatus includes: a first optical pickup and a second optical pickup which record data on an optical disc and reproduce data recorded on the optical disc; a slide mechanism which has the first and second optical pickups mounted thereon to slide the first and second optical pickups in a radial direction of the optical disc; a seek command receiver which receives a seek command; a first optical pickup controller which causes the first optical pickup to perform a search on the basis of the seek command received by the seek command receiver; a slide mechanism controller which controls the slide mechanism on the basis of the seek command received by the seek command receiver; and a second optical pickup controller which turns off a tracking servo of the second optical pickup when the first and second optical pickups are slid by the slide mechanism.

15 Claims, 8 Drawing Sheets

OPTICAL DISC DRIVE APPARATUS, OPTICAL PICKUP CONTROL METHOD AND PROGRAM

BACKGROUND OF THE INVENTION

1. Field of the Invention

The present invention relates to an optical disc drive apparatus, an optical pickup control method and a program.

2. Description of the Related Art

In recent years, the capacity of recording media such as optical discs has increased, and implementation of a high transfer rate is desired for writing and reading data at high speed.

Particularly, for example, an optical disc drive apparatus having two optical pickups (OP) in order to read a signal recorded on an optical disc at high speed is proposed (for example, refer to Japanese Unexamined Patent Application Publication No. 2006-268952).

SUMMARY OF THE INVENTION

However, as the optical disc drive apparatus in which the two optical pickups are mounted, there are those in which the two optical pickups are mounted in a single sled mechanism, and those in which the two optical pickups are mounted in different sled mechanisms. In a case where the two optical pickups are mounted in the single sled mechanism to simultaneously read, simultaneously write, or simultaneously read and write, if slide control of the sled mechanism is performed individually by the optical pickups when a seek operation is performed, the slide control of the sled mechanism becomes unstable, and there is a problem in that the seek operation may not be performed stably and at high speed.

It is desirable to provide a new optical disc drive apparatus, and optical pickup control method and program which are improved to perform a seek operation stably and at high speed in a case where two optical pickups are mounted in a single sled mechanism to simultaneously read, simultaneously write, or simultaneously read and write.

An optical disc drive apparatus according to an embodiment of the invention includes: a first optical pickup and a second optical pickup which record data on an optical disc and reproduce data recorded on the optical disc; a slide mechanism which has the first and second optical pickups mounted thereon to slide the first and second optical pickups in a radial direction of the optical disc; a seek command receiver which receives a seek command; a first optical pickup controller which causes the first optical pickup to perform a search on the basis of the seek command received by the seek command receiver; a slide mechanism controller which controls the slide mechanism on the basis of the seek command received by the seek command receiver; and a second optical pickup controller which turns off a tracking servo of the second optical pickup when the first and second optical pickups are slid by the slide mechanism.

The first optical pickup controller may cause the first optical pickup to perform a search by turning off a tracking servo of the first optical pickup and thereafter causes the first optical pickup to perform a search by turning on the tracking servo of the first optical pickup on the basis of the seek command received by the seek command receiver.

The first optical pickup controller may cause the first optical pickup to perform a search by turning on the tracking servo of the first optical pickup on the basis of the seek command received by the seek command receiver.

An optical disc drive apparatus according to another embodiment of the invention includes: a first optical pickup and a second optical pickup which record data on an optical disc and reproduce data recorded on the optical disc; a slide mechanism which has the first and second optical pickups mounted thereon to slide the first and second optical pickups in a radial direction of the optical disc; a seek command receiver which receives a seek command; a first optical pickup controller which causes the first optical pickup to perform a search on the basis of the seek command received by the seek command receiver; a slide mechanism controller which controls the slide mechanism on the basis of the seek command received by the seek command receiver; a search request receiver which receives a search request; and a second optical pickup controller which causes the second optical pickup to perform a search by turning on a tracking servo of the second optical pickup on the basis of the search request received by the search request receiver.

The first optical pickup controller may cause the first optical pickup to perform a search by turning off a tracking servo of the first optical pickup and thereafter causes the first optical pickup to perform a search by turning on the tracking servo of the first optical pickup on the basis of the seek command received by the seek command receiver.

The first optical pickup controller may cause the first optical pickup to perform a search by turning on a tracking servo of the first optical pickup on the basis of the seek command received by the seek command receiver.

The first and second optical pickup controllers may simultaneously turn on the tracking servos of the first and second optical pickups.

An optical pickup control method according to a further embodiment of the invention includes the steps of: receiving a seek command; controlling a first optical pickup for recording data on an optical disc or reproducing data recorded on the optical disc to perform a search on the basis of the seek command received in the step of receiving the seek command; controlling a slide mechanism which has the first optical pickup and a second optical pickup mounted thereon to slide the first and second optical pickups in a radial direction of the optical disc on the basis of the seek command received in the step of receiving the seek command; and controlling a tracking servo of the second optical pickup to be turned off when the first and second optical pickups are slid by the slide mechanism.

An optical pickup control method according to still another embodiment of the invention includes the steps of: receiving a seek command; controlling a first optical pickup for recording data on an optical disc or reproducing data recorded on the optical disc to perform a search on the basis of the seek command received in the step of receiving the seek command; controlling a slide mechanism which has the first optical pickup and a second optical pickup mounted thereon to slide the first and second optical pickups in a radial direction of the optical disc on the basis of the seek command received in the step of receiving the seek command; receiving a search request; and controlling the second optical pickup to perform a search by turning on a tracking servo of the second optical pickup on the basis of the search request received in the step of receiving the search request.

A program according to still further another embodiment of the invention is executed to cause a computer to function as: a seek command receiver which receives a seek command; a first optical pickup controller which controls a first optical pickup for recording data on an optical disc or reproducing data recorded on the optical disc to perform a search on the basis of the seek command received by the seek command receiver; a slide mechanism controller which controls a slide mechanism that has the first optical pickup and a second optical pickup mounted thereon to slide the first and second optical pickups in a radial direction of the optical disc on the basis of the seek command received by the seek command receiver; and a second optical pickup controller which controls a tracking servo of the second optical pickup to be turned off when the first and second optical pickups are slid by the slide mechanism.

A program according to yet another embodiment of the invention is executed to cause a computer to function as: a seek command receiver which receives a seek command; a first optical pickup controller which controls a first optical pickup for recording data on an optical disc or reproducing data recorded on the optical disc to perform a search on the basis of the seek command received by the seek command receiver; a slide mechanism controller which controls a slide mechanism that has the first optical pickup and a second optical pickup mounted thereon to slide the first and second optical pickups in a radial direction of the optical disc on the basis of the seek command received by the seek command receiver; a search request receiver which receives a search request; and a second optical pickup controller which controls the second optical pickup to perform a search by turning on a tracking servo of the second optical pickup on the basis of the search request received by the search request receiver.

According to the embodiments of the invention described above, the seek operation can be performed stably and at high speed in the case where the two optical pickups are mounted on the single sled mechanism to simultaneously read, simultaneously write, or simultaneously read and write.

DESCRIPTION OF THE PREFERRED EMBODIMENTS

Figure 1:
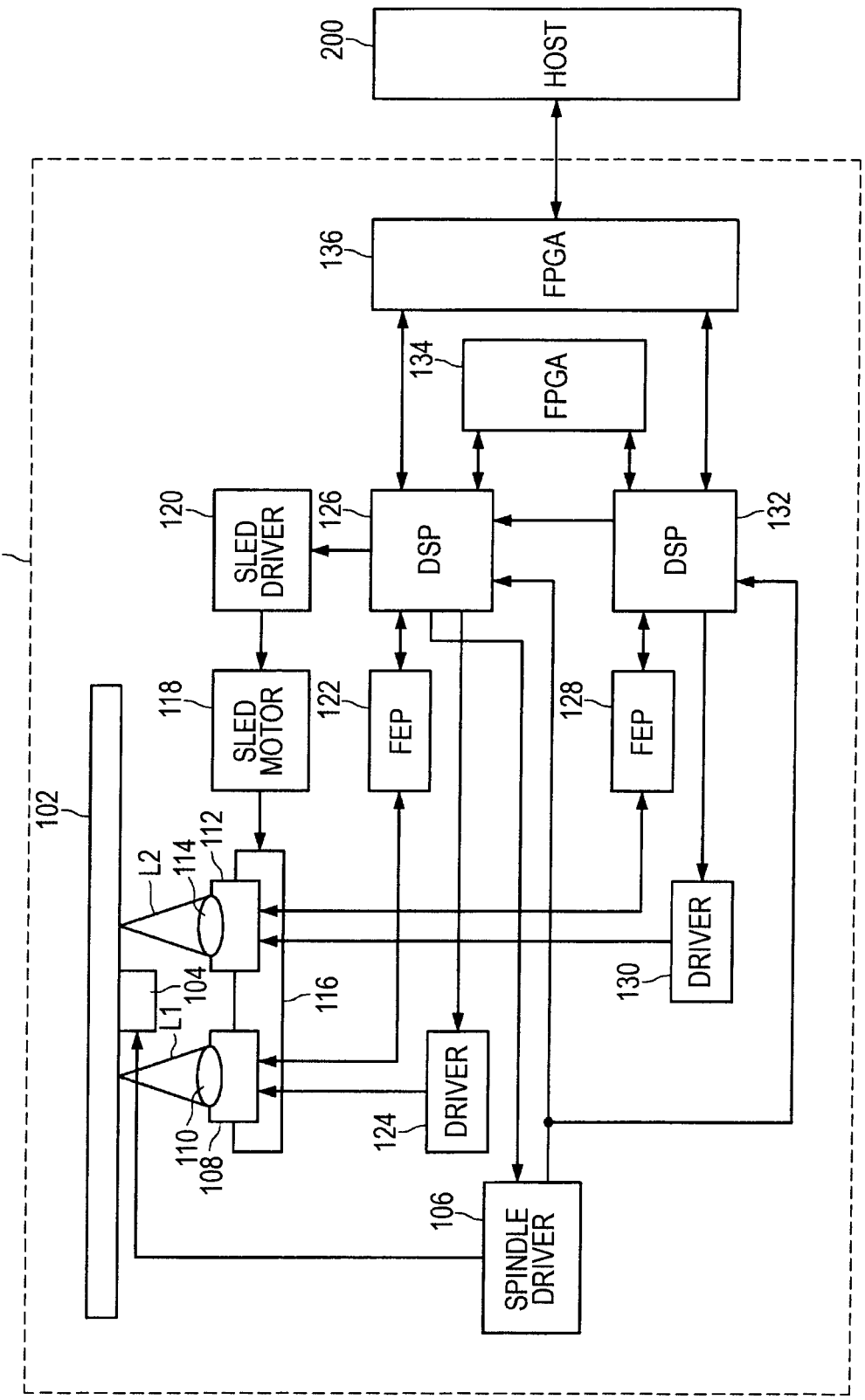
FIG. 1 is a block diagram schematically illustrating the configuration of an optical disc drive apparatus according to an embodiment of the invention.

Exemplary embodiments of the invention will be described in detail with reference to the accompanying drawings. In addition, in the following description and the drawings, like elements having substantially the same functions and configurations are denoted by like reference numerals, and overlapping descriptions thereof will be omitted.

The description will be provided in the following order:
1. Optical Disc Drive Apparatus
2. First Optical Pickup Control Process
3. Second Optical Pickup Control Process
4. Modified Example of First Optical Pickup Control Process
5. Modified Example of Second Optical Pickup Control Process Optical Disc Drive Apparatus First, an optical disc drive apparatus according to an embodiment of the invention will be described. FIG. 1 is a block diagram schematically illustrating the configuration of the optical disc drive apparatus according to the embodiment of the invention. In FIG. 1, the optical disc drive apparatus 100 and a host 200 are illustrated.

In FIG. 1, the optical disc drive apparatus 100 includes an optical disc 102, a spindle motor 104, a spindle driver 106, optical pickups 108 and 112, objective lenses 110 and 114, a sled mechanism 116, a sled motor 118, and a sled driver 120. In addition, the optical disc drive apparatus 100 includes front-end processors (FEPs) 122 and 128, drivers 124 and 130, digital signal processors (DSPs) 126 and 132, and FPGAs (Field Programmable Gate Arrays) 134 and 136.

The optical disc 102 is an optical recording medium such as a CD (Compact Disc) or a DVD (Digital Versatile Disc) in various optical information recording types. The spindle motor 104 rotates the optical disc 102 at a predetermined rotational speed. The spindle driver 106 operates the spindle motor 104.

The optical pickup 108 includes the objective lens 110 and allows a laser beam L1 to illuminate the optical disc 102 in order to record a signal on the optical disc 102 or reproduce a signal recorded on the optical disc 102. Similarly, the optical pickup 112 includes the objective lens 114 and allows a laser beam L2 to illuminate the optical disc 102 in order to record a signal on the optical disc 102 or reproduce a signal recorded on the optical disc 102. According to this embodiment, the optical pickup 108 is called channel A, and the optical pickup 112 is called channel B.

The sled mechanism 116 is an example of a slide mechanism according to the embodiment of the invention and has the optical pickups 108 and 112 mounted thereon. The sled mechanism 116 slides the optical pickups 108 and 112 in a radial direction of the optical disc 102. The sled motor 118 drives the sled mechanism 116. The sled driver 120 operates the sled motor 118.

The FEP 122 receives a reproduction signal from channel A. The driver 124 operates an actuator (not shown) of the optical pickup 108 which performs tracking control, focus control, and tilt control of the objective lens 110. The FEP 128 receives a reproduction signal from channel B. The driver 130 operates an actuator (not shown) of the optical pickup 112 which performs tracking control, focus control, and tilt control of the objective lens 114. Moreover, the drivers 124 and 130, for example, may operate an actuator (not shown) for controlling an expander (not shown) as an optical system lens for correcting distortion in a case where the optical pickups 108 and 112 emit blue lasers.

The DSP 126 is an example of a seek command receiver, a first optical pickup controller, and a slide mechanism controller according to the embodiment of the invention and performs control of channel A. In addition, the DSP 126 performs control of the sled mechanism 116. Moreover, the DSP 126 performs control of the spindle motor 104. On the other hand, the DSP 132 is an example of a second optical pickup controller and a search request receiver according to the embodiment of the invention and performs control of channel B. In addition, the DSP 132 inputs a sled control signal of channel B to the DSP 126. The DSP 126 calculates the sled control signal of channel B output from the DSP 132 and a sled control signal of channel A and inputs a sled control signal as the calculation result to the sled driver 120. The sled driver 120 operates the sled motor 118 on the basis of the sled control signal output from the DSP 126 to drive the sled mechanism 116.

Moreover, an FG signal output from the spindle driver 106 is input to the DSP 126 of channel A and the DSP 132 of channel B. The DSPs 126 and 132 measure the period of the input FG signal to acquire the rotational speed of the optical disc 102.

The FPGA 134 controls interchannel communication between the channels A and B. The DSP 126 of channel A and the DSP 132 of channel B perform interchannel communication via the FPGA 134 and thus obtains synchronization necessary to perform a seek operation.

The FPGA 136 collects data output from the DSP 126 of channel A and data output from the DSP 132 of channel B and output the data to the host 200 side.

The host 200 issues a seek command, a read command, and the like to the FPGA 136. In addition, the host 200 processes a codec or the like of image data or audio data which is data output from the FPGA 136.

According to this embodiment, the optical disc drive apparatus 100 has the FEPs 122 and 128 and the DSPs 126 and 132 respectively for channels A and B. Accordingly, the optical disc drive apparatus 100 can individually operate channels A and B.

First Optical Pickup Control Process

Figure 2:
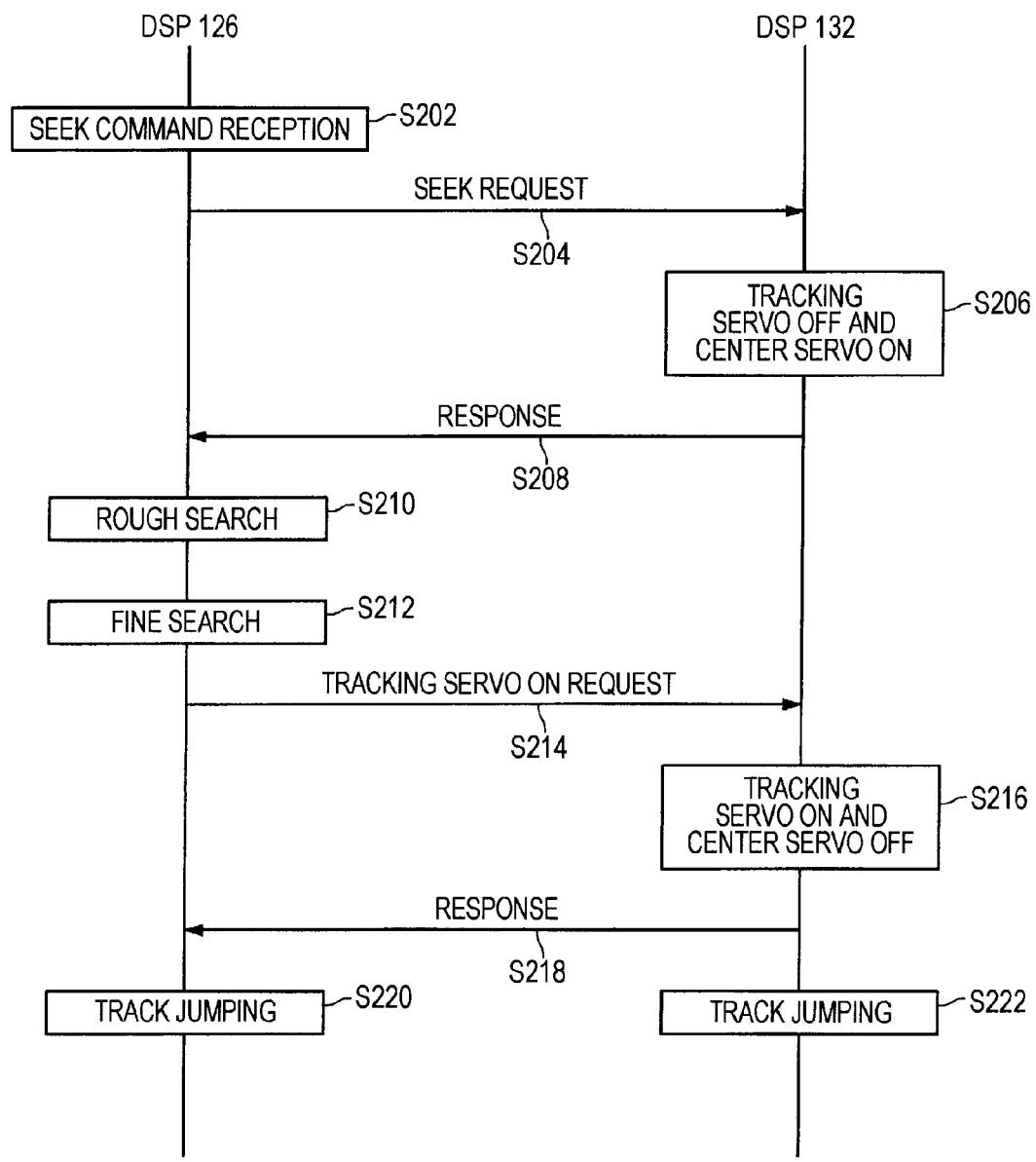
FIG. 2 is a sequence diagram of a first optical pickup control process executed by the optical disc drive apparatus in FIG. 1.
Figure 3:
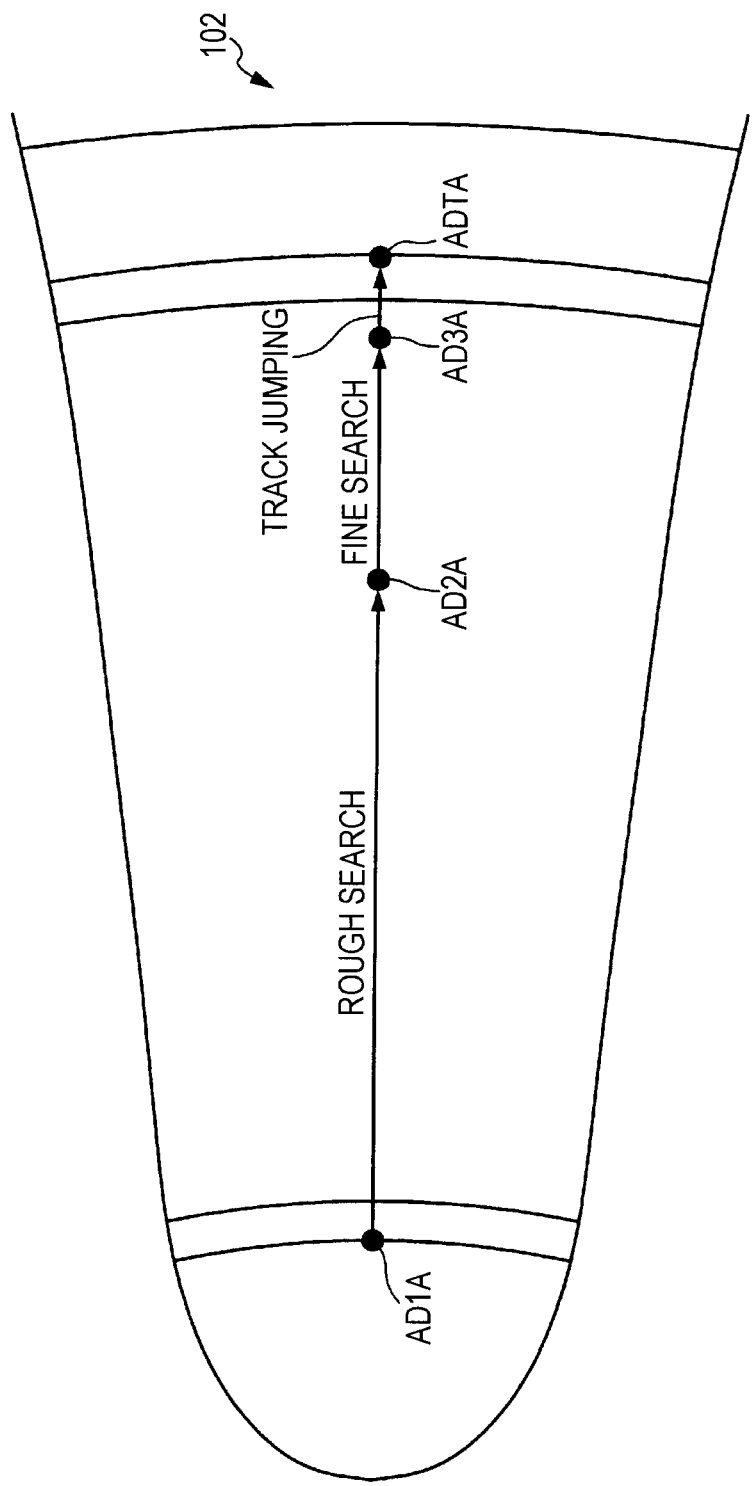
FIG. 3 is a diagram illustrating a rough search, a fine search, and a track jumping during the first optical pickup control process of FIG. 2.

Next, a first optical pickup control process executed by the optical disc drive apparatus 100 in FIG. 1 will be described. FIG. 2 is a sequence diagram of the first optical pickup control process executed by the optical disc drive apparatus 100 in FIG. 1. This process is a process executed after the optical disc drive apparatus 100 receives a seek command from the host 200. In addition, this process is, as illustrated in FIG. 3, a process executed in a case where the distance from the current address AD1A to the target address ADTA is large on the optical disc 102.

In FIG. 2, first, the DSP 126 of the optical disc drive apparatus 100 receives the seek command from the host 200 via the FPGA 136 (Step S202).

Next, the DSP 126 performs a seek request to the DSP 132 via the FPGA 134 for acquiring synchronization between channels A and B (Step S204).

Next, the DSP 132 transmits a control signal for turning off a tracking servo and turning on a center servo of the optical pickup 112 to the driver 130, and the driver 130 turns off the tracking servo of the optical pickup 112 and turns on the center servo thereof (Step S206). Here, the tracking servo is a control for detecting a track position of the optical disc 102 and make a beam spot follow a track. In addition, the center servo is a control for suppressing the objective lenses 110 and 114 from shaking when the optical pickups 108 and 112 are slid by the sled mechanism 116 in a case where the tracking servo of the optical pickups 108 and 112 are turned off.

Next, the DSP 132 performs a response to the seek request to the DSP 132 via the FPGA 134 (Step S208).

Next, the DSP 126 transmits a control signal for a rough search to the driver 124 and the sled driver 120. The sled driver 120 operates the sled motor 118 on the basis of the control signal transmitted from the DSP 126. In addition, the sled motor 118 causes the optical pickups 108 and 112 to slide for the rough search by driving the sled mechanism 116. On the other hand, the driver 124 causes the optical pickup 108 to perform the rough search by operating an actuator (not shown) on the basis of the control signal transmitted from the DSP 126 (Step S210). Moreover, in order to perform the rough search, the tracking servo of the optical pickup 108 is turned off and the center servo thereof is turned on. Here, the rough search is, as illustrated in FIG. 3, a control for searching the optical disc 102 to approach the target address ADTA from the current address AD1A, for example, to an address AD2A at high speed.

Next, the DSP 126 transmits a control signal for a fine search to the driver 124 and the sled driver 120. The sled driver 120 operates the sled motor 118 on the basis of the control signal transmitted from the DSP 126. In addition, the sled motor 118 operates the optical pickups 108 and 112 to slide for the fine search by driving the sled mechanism 116. On the other hand, the driver 124 causes the optical pickup 108 to perform the fine search by operating an actuator (not shown) on the basis of the control signal transmitted from the DSP 126 (Step S212). Here, the fine search is, as illustrated in FIG. 3, control for accurately searching the optical disc 102 from the address AD2A after the rough search to an address AD3A of a remaining ±N track near the target address ADTA. Moreover, the numerical value of the remaining ±N track may be changed in response to visual field characteristics of the objective lenses 110 and 114.

Next, the DSP 126 performs a tracking servo ON request to the DSP 132 via the FPGA 134 (Step S214).

Next, the DSP 132 transmits a control signal for turning on the tracking servo and turning off the center servo of the optical pickup 112 to the driver 130, and the driver 130 turns on the tracking servo and turning off the center servo of the optical pickup 112 (Step S216).

Next, the DSP 132 performs a response to the tracking servo ON request to the DSP 132 via the FPGA 134 (Step S218).

Next, the DSP 126 transmits a control signal for a track jumping to the target address ADTA illustrated in FIG. 3 to the driver 124. The driver 124 causes the optical pickup 108 to perform the track jumping to the target address ADTA by operating an actuator (not shown) on the basis of the control signal transmitted from the DSP 126 (Step S220). Accordingly, the optical pickup 108 can cause a beam spot to illuminate a track of the target address ADTA.

On the other hand, the DSP 132 transmits a control signal for a track jumping to a target address ADTB (not shown) to the driver 130. The driver 130 causes the optical pickup 112 to perform the track jumping to the target address ADTB by operating an actuator (not shown) on the basis of the control signal transmitted from the DSP 132 (Step S222). Accordingly, the optical pickup 112 can cause a beam spot to illuminate a track of the target address ADTB.

According to the first optical pickup control process of FIG. 2, on the optical disc drive apparatus 100 having the two optical pickups 108 and 112, in the case where the DSP 126 of the optical pickup 108 receives the seek command, the tracking servo of the optical pickup 112 is turned off and the optical pickup 108 performs the rough search and the fine search so as to search for the address AD3A at which the target addresses ADTA and ADTB can be searched without slide control of the sled mechanism 116, that is, by track jumping alone. That is, the slide control of the sled mechanism 116 is performed by the optical pickup 108 alone, so that the slide control of the sled mechanism 116 becomes stable. When the slide control of the sled mechanism 116 becomes stable, a seek operation can be performed stably and at high speed. Therefore, in the case where the two optical pickups 108 and 112 are mounted in the single sled mechanism 116, the seek operation can be performed stably and at high speed.

Moreover, in the first optical pickup control process of FIG. 2, the DSP 126 receives the seek command. However, in a case where the DSP 132 receives the seek command, before the above-mentioned Step S202, the DSP 132 performs a seek request to the DSP 126 via the FPGA 134. In addition, the DSP 126 performs a response to the seek request to the DSP 132 via the FPGA 134. Thereafter, the DSPs 126 and 132 perform the process after the above-mentioned Step S202, thereby exhibiting the same effect as that of the first optical pickup control process of FIG. 2.

Second Optical Pickup Control Process

Figure 4:
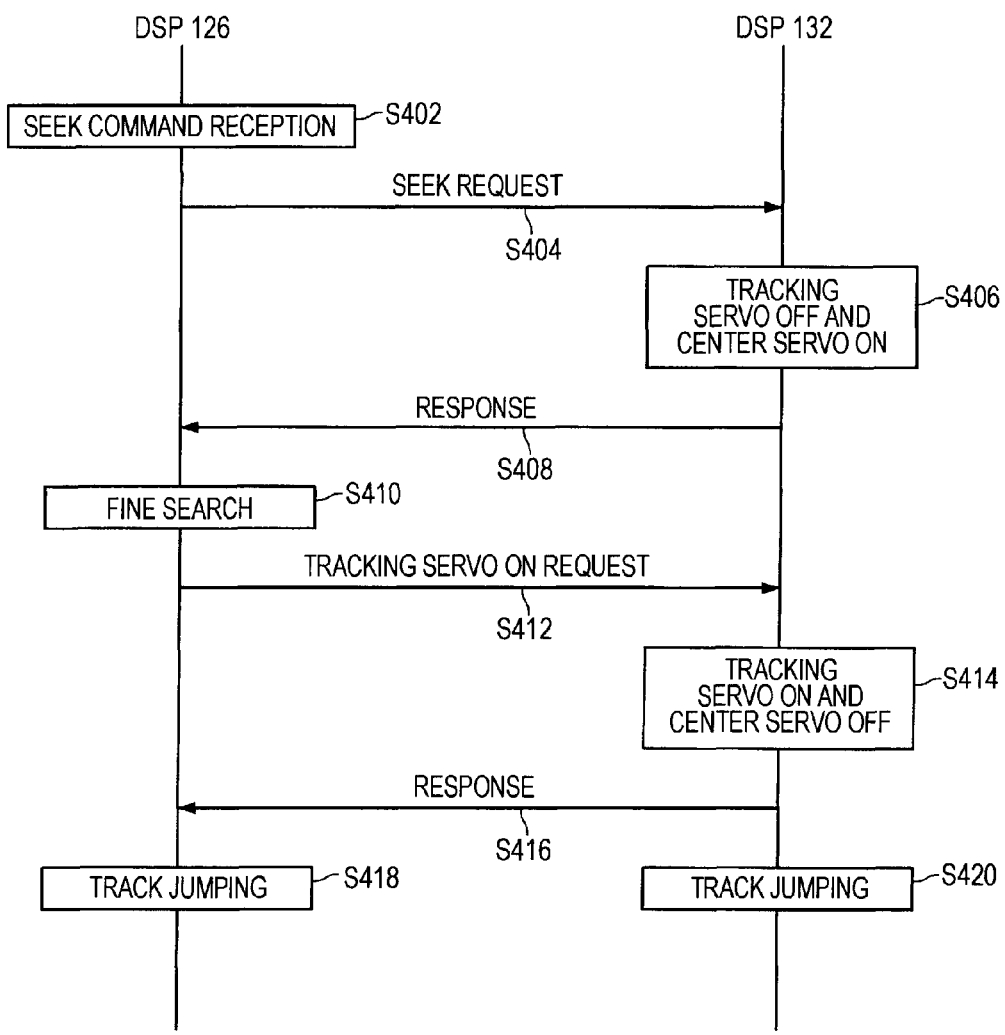
FIG. 4 is a sequence diagram of a second optical pickup control process executed by the optical disc drive apparatus in FIG. 1.
Figure 5:
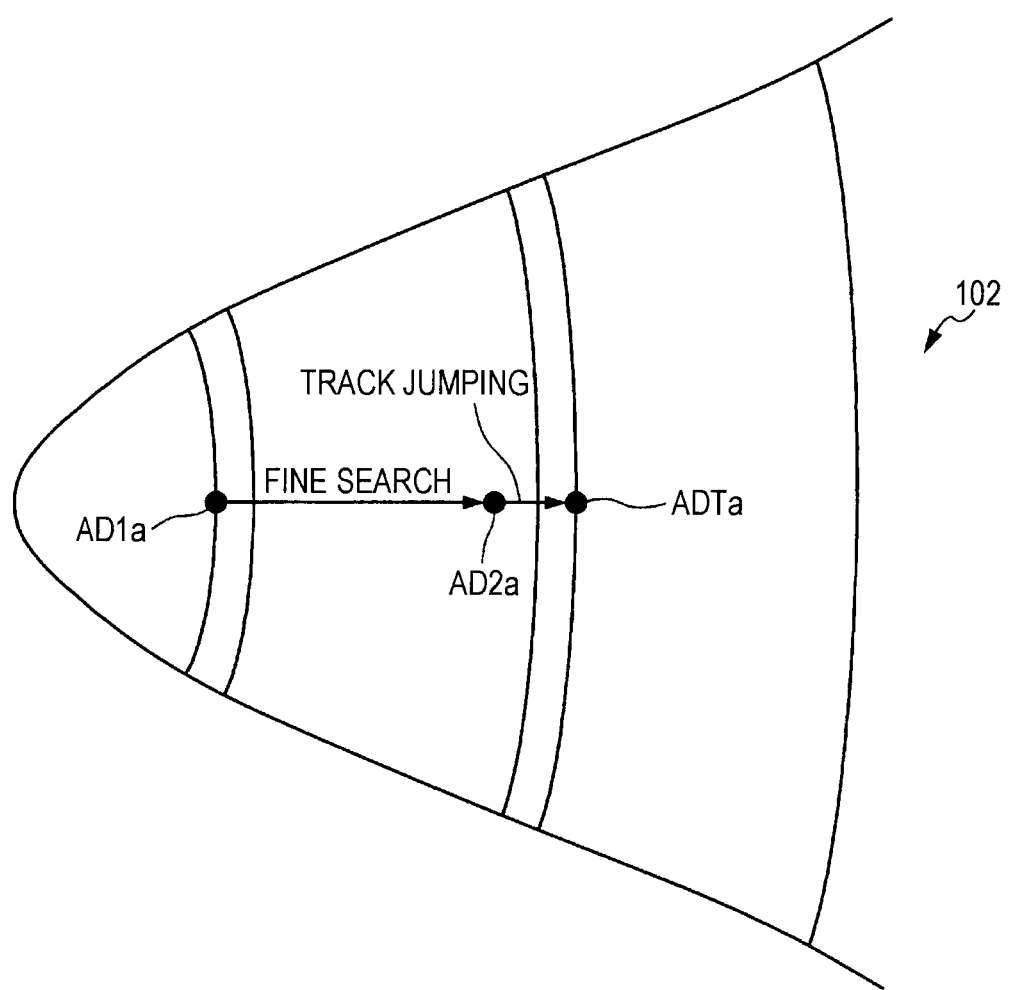
FIG. 5 is a diagram illustrating a fine search and track jumping during the second optical pickup control process of FIG. 4.

Next, a second optical pickup control process executed by the optical disc drive apparatus 100 in FIG. 1 will be described. FIG. 4 is a sequence diagram of the second optical pickup control process executed by the optical disc drive apparatus 100 in FIG. 1. This process is a process executed after the optical disc drive apparatus 100 receives a seek command from the host 200. In addition, this process is, as illustrated in FIG. 5, a process executed in a case where a distance from a current address AD1A to a target address ADTA is shorter than the case of FIG. 3 on the optical disc 102.

In FIG. 4, first, the DSP 126 of the optical disc drive apparatus 100 receives the seek command from the host 200 via the FPGA 136 (Step S402).

Next, the DSP 126 performs a seek request to the DSP 132 via the FPGA 134 for acquiring synchronization between channels A and B (Step S404).

Next, the DSP 132 transmits a control signal for turning off the tracking servo and turning on the center servo of the optical pickup 112 to the driver 130, and the driver 130 turns off the tracking servo of the optical pickup 112 and turns on the center servo thereof (Step S406).

Next, the DSP 132 performs a response to the seek request to the DSP 132 via the FPGA 134 (Step S408).

Next, the DSP 126 transmits a control signal for a fine search to the driver 124 and the sled driver 120. The sled driver 120 operates the sled motor 118 on the basis of the control signal transmitted from the DSP 126. In addition, the sled motor 118 causes the optical pickups 108 and 112 to slide for the fine search by driving the sled mechanism 116. On the other hand, the driver 124 causes the optical pickup 108 to perform the fine search by operating the actuator (not shown) on the basis of the control signal transmitted from the DSP 126 (Step S410). Moreover, in order to perform the fine search, the tracking servo of the optical pickup 108 is turned on and the center servo thereof is turned off. Here, the fine search is, as illustrated in FIG. 5, a control for accurately searching the optical disc 102 from a current address AD1a to an address AD2a of a remaining ±N track near a target address ADTa.

Next, the DSP 126 performs a tracking servo ON request to the DSP 132 via the FPGA 134 (Step S412).

Next, the DSP 132 transmits a control signal for turning on the tracking servo and turning off the center servo of the optical pickup 112 to the driver 130, and the driver 130 turns on the tracking servo and turning off the center servo of the optical pickup 112 (Step S414).

Next, the DSP 132 performs a response to the tracking servo ON request to the DSP 132 via the FPGA 134 (Step S416).

Next, the DSP 126 transmits a control signal for a track jumping to the target address ADTa illustrated in FIG. 5 to the driver 124. The driver 124 causes the optical pickup 108 to perform the track jumping to the target address ADTa by operating the actuator (not shown) on the basis of the control signal transmitted from the DSP 126 (Step S418). Accordingly, the optical pickup 108 can cause a beam spot to illuminate a track of the target address ADTa.

On the other hand, the DSP 132 transmits a control signal for a track jumping to a target address ADTb (not shown) to the driver 130. The driver 130 causes the optical pickup 112 to perform the track jumping to the target address ADTb by operating the actuator (not shown) on the basis of the control signal transmitted from the DSP 132 (Step S420). Accordingly, the optical pickup 112 can cause a beam spot to illuminate a track of the target address ADTb.

According to the second optical pickup control process of FIG. 4, on the optical disc drive apparatus 100 having the two optical pickups 108 and 112, in the case where the DSP 126 of the optical pickup 108 receives the seek command, the tracking servo of the optical pickup 112 is turned off and the optical pickup 108 performs the fine search to search for the address AD2a at which the target addresses ADTa and ADTb can be searched without slide control of the sled mechanism 116, that is, by track jumping alone. That is, the slide control of the sled mechanism 116 is performed by the optical pickup 108 alone, so that the slide control of the sled mechanism 116 becomes stable. When the slide control of the sled mechanism 116 becomes stable, a seek operation can be performed stably and at high speed. Therefore, in the case where the two optical pickups 108 and 112 are mounted in the single sled mechanism 116, the seek operation can be performed stably and at high speed.

Moreover, in the second optical pickup control process of FIG. 4, the DSP 126 receives the seek command. However, in a case where the DSP 132 receives the seek command, before the above-mentioned Step S402, the DSP 132 performs a seek request to the DSP 126 via the FPGA 134. In addition, the DSP 126 performs a response to the seek request to the DSP 132 via the FPGA 134. Thereafter, the DSPs 126 and 132 perform the process after the above-mentioned Step S402, thereby exhibiting the same effect as that of the second optical pickup control process of FIG. 4.

Modified Example of First Optical Pickup Control Process

Figure 6:
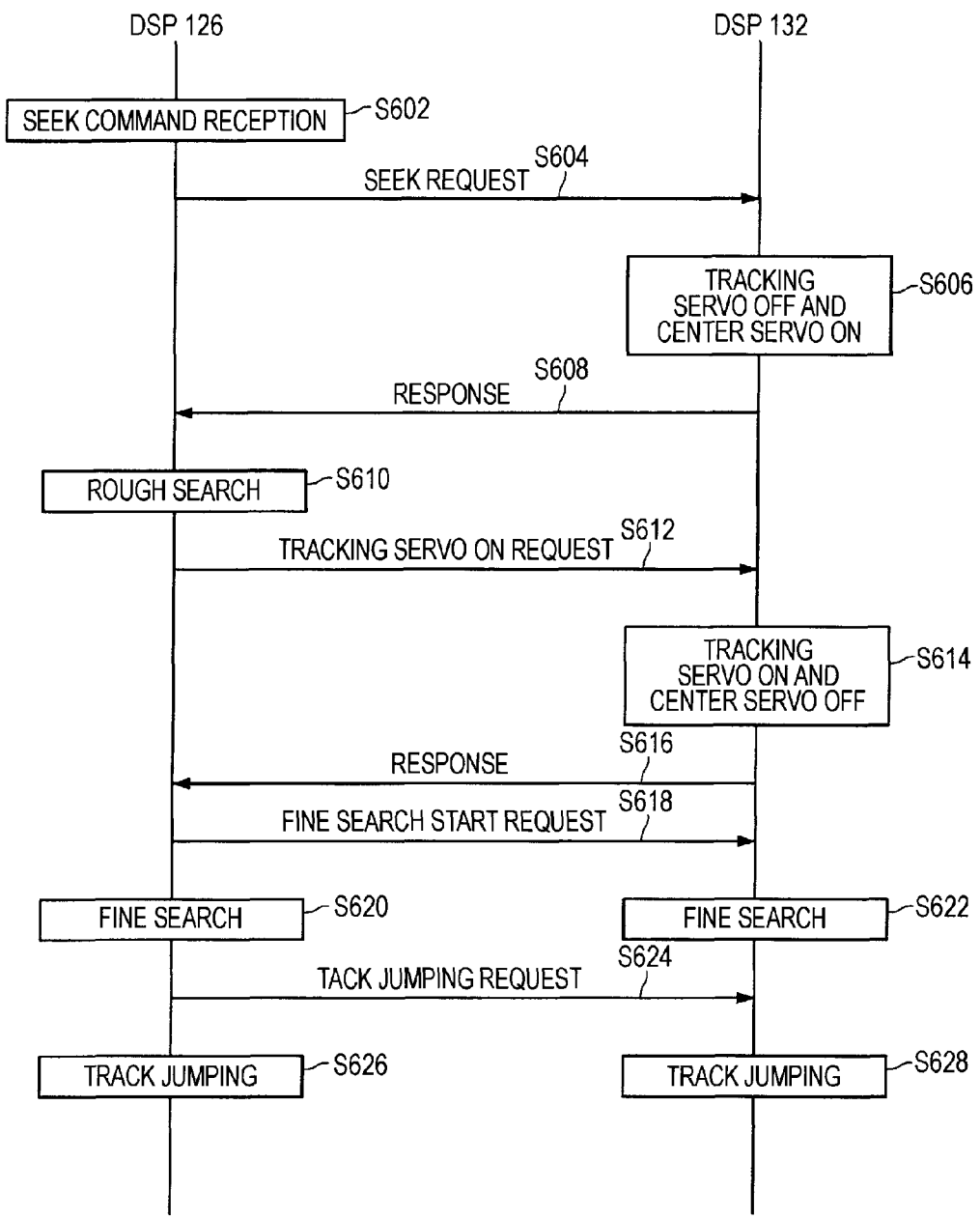
FIG. 6 is a sequence diagram of a modified example of the first optical pickup control process of FIG. 2.

Next, a modified example of the first optical pickup control process of FIG. 2 will be described. FIG. 6 is a sequence diagram of the modified example of the first optical pickup control process of FIG. 2. The modified example is different from the first optical pickup control process described above with reference to FIG. 2 in that when a fine search is performed during the seek operation of the optical pickups 108 and 112, the optical pickups 108 and 112 are in synchronization with each other to individually perform the fine search.

In FIG. 6, first, the DSP 126 of the optical disc drive apparatus 100 receives the seek command from the host 200 via the FPGA 136 (Step S602).

Next, the DSP 126 performs a seek request to the DSP 132 via the FPGA 134 for acquiring synchronization between channels A and B (Step S604).

Next, the DSP 132 transmits a control signal for turning off the tracking servo and turning on the center servo of the optical pickup 112 to the driver 130, and the driver 130 turns off the tracking servo of the optical pickup 112 and turns on the center servo thereof (Step S606).

Next, the DSP 132 performs a response to the seek request to the DSP 132 via the FPGA 134 (Step S608).

Next, the DSP 126 transmits a control signal for a rough search to the driver 124 and the sled driver 120. The sled driver 120 operates the sled motor 118 on the basis of the control signal transmitted from the DSP 126. In addition, the sled motor 118 causes the optical pickups 108 and 112 to slide for the rough search by driving the sled mechanism 116. On the other hand, the driver 124 causes the optical pickup 108 to perform the rough search by operating the actuator (not shown) on the basis of the control signal transmitted from the DSP 126 (Step S610). Moreover, in order to perform the rough search, the tracking servo of the optical pickup 108 is turned off and the center servo thereof is turned on. Here, the rough search is, as illustrated in FIG. 3, a control for searching the optical disc 102 to approach the target address ADTA from the current address AD1A, for example, to the address AD2A at high speed.

Next, the DSP 126 performs a tracking servo ON request to the DSP 132 via the FPGA 134 (Step S612).

Next, the DSP 132 transmits a control signal for turning on the tracking servo and turning off the center servo of the optical pickup 112 to the driver 130, and the driver 130 turns on the tracking servo and turning off the center servo of the optical pickup 112 (Step S614).

Next, the DSP 132 performs a response to the tracking servo ON request to the DSP 132 via the FPGA 134 (Step S616).

Next, the DSP 126 performs a fine search start request to the DSP 132 via the FPGA 134 (Step S618). Here, the DSP 126 notifies the DSP 132 of the number of tracks of the fine search to be performed next along with the fine search start request.

Next, the DSP 126 transmits a control signal for the fine search to the driver 124 and the sled driver 120. The sled driver 120 operates the sled motor 118 on the basis of the control signal transmitted from the DSP 126. In addition, the sled motor 118 causes the optical pickups 108 and 112 to slide for the fine search by driving the sled mechanism 116. On the other hand, the driver 124 causes the optical pickup 108 to perform the fine search by operating the actuator (not shown) on the basis of the control signal transmitted from the DSP 126 (Step S620). Here, the fine search is, as illustrated in FIG. 3, a control for accurately searching the optical disc 102 from the address AD2A after the rough search to the address AD3A of the remaining ±N track near the target address ADTA.

On the other hand, the DSP 132 transmits a control signal for the fine search corresponding to the number of tracks notified in Step S618 to the driver 130 in synchronization with the DSP 126. The driver 130 causes the optical pickup 112 to perform the fine search by operating the actuator (not shown) on the basis of the control signal transmitted from the DSP 132 (Step S622). Here, the fine search is a control for accurately searching the optical disc 102 from the address AD2B (not shown) after the rough search to an address AD3B of a remaining ±N track near the target address ADTB (not shown).

Next, the DSP 126 performs a track jumping request to the DSP 132 via the FPGA 134 (step S624).

Next, the DSP 126 transmits a control signal for a track jumping to the target address ADTA illustrated in FIG. 3 to the driver 124. The driver 124 causes the optical pickup 108 to perform the track jumping to the target address ADTA by operating the actuator (not shown) on the basis of the control signal transmitted from the DSP 126 (Step S626). Accordingly, the optical pickup 108 can cause a beam spot to illuminate a track of the target address ADTA.

On the other hand, the DSP 132 transmits a control signal for a track jumping to the target address ADTB (not shown) to the driver 130. The driver 130 causes the optical pickup 112 to perform the track jumping to the target address ADTB by operating an actuator (not shown) on the basis of the control signal transmitted from the DSP 132 (Step S628). Accordingly, the optical pickup 112 can cause a beam spot to illuminate a track of the target address ADTB.

According to the modified example of the first optical pickup control process of FIG. 6, on the optical disc drive apparatus 100 having the two optical pickups 108 and 112, in the case where the DSP 126 of the optical pickup 108 receives the seek command, the tracking servo of the optical pickup 112 is turned off and the optical pickup 108 performs the rough search, and when the fine search is performed, the two optical pickups 108 and 112 perform the fine search in synchronization with each other. That is, during the rough search, the slide control of the sled mechanism 116 is performed by the optical pickup 108 alone, and the fine search is performed by the optical pickups 108 and 112 while they are in synchronization with each other, so that the slide control of the sled mechanism 116 becomes stable. When the slide control of the sled mechanism 116 becomes stable, a seek operation can be performed stably and at high speed. Therefore, in the case where the two optical pickups 108 and 112 are mounted in the single sled mechanism 116, the seek operation can be performed stably and at high speed.

Figure 8:
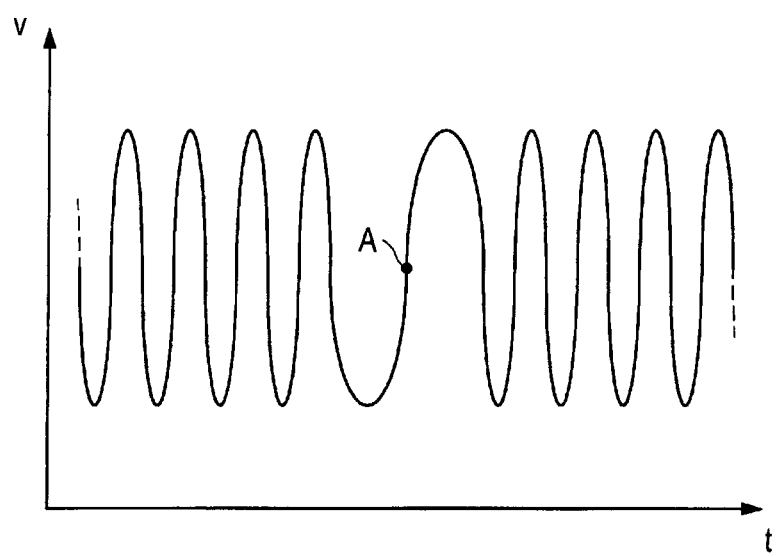
FIG. 8 is a graph illustrating a traverse signal output from an FEP (Front End Processor) of FIG. 1.

In addition, in a case where the tracking servo is turned on, in terms of stability, as illustrated in FIG. 8, when the frequency of a traverse signal output from the FEPs 122 and 128 is reduced, for example, at a time point A illustrated in FIG. 8, the tracking servo may be turned on. Sparseness and denseness of the traverse signal as illustrated in FIG. 8 is caused by eccentricity of the optical disc 102. In the modified example of the first optical pickup control process of FIG. 6, the optical pickups 108 and 112 simultaneously turn on the tracking servo after the rough search and moreover individually performs the fine search in synchronization. Therefore, as compared with the first optical pickup control process of FIG. 2, the process of Step S216 in FIG. 2 can be omitted from the process of FIG. 6, so that a waiting time for turning on the tracking servo can be reduced. Accordingly, the time taken to perform the entire seek operation can be reduced.

Moreover, in the modified example of the first optical pickup control process of FIG. 6, the DSP 126 receives the seek command. However, in the case where the DSP 132 receives the seek command, before the above-mentioned Step S602, the DSP 132 performs a seek request to the DSP 126 via the FPGA 134. In addition, the DSP 126 performs a response to the seek request to the DSP 132 via the FPGA 134. Thereafter, the DSPs 126 and 132 perform the process after the above-mentioned Step S602, thereby exhibiting the same effect as that of the modified example of the first optical pickup control process of FIG. 6.

Modified Example of Second Optical Pickup Control Process

Figure 7:
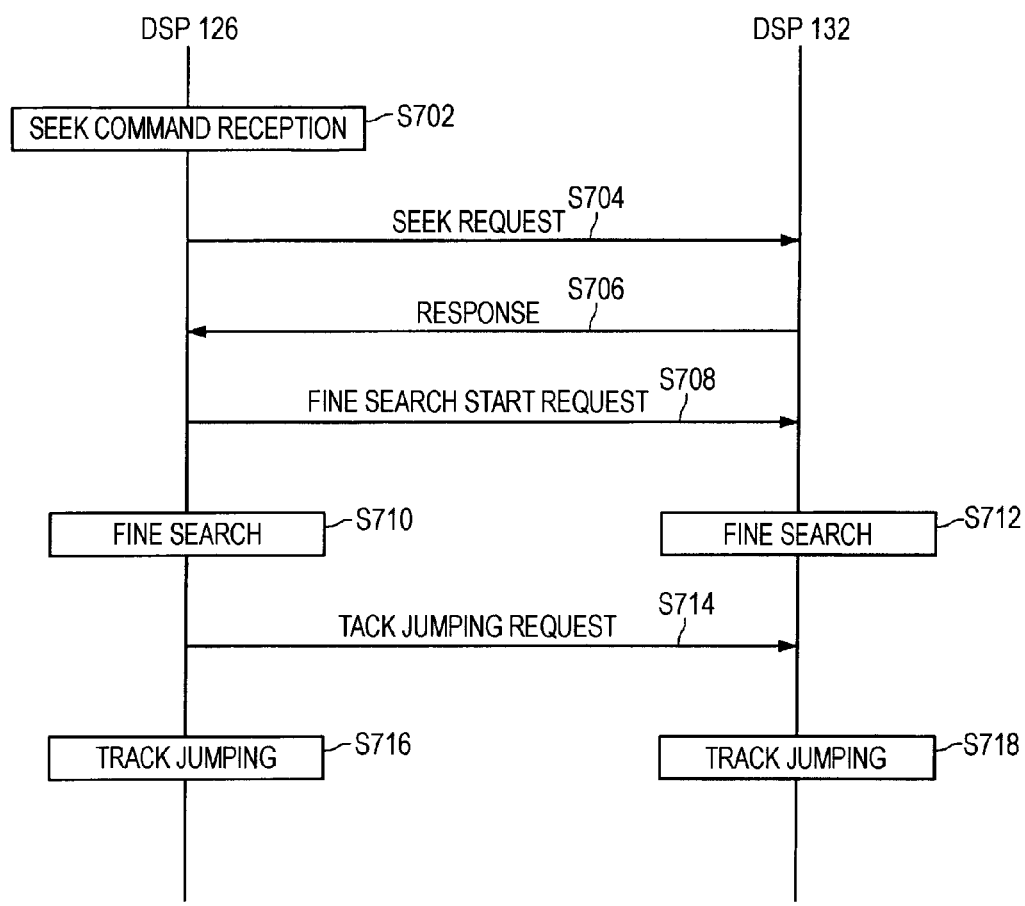
FIG. 7 is a sequence diagram of a modified example of the second optical pickup control process of FIG. 4.

Next, a modified example of the second optical pickup control process of FIG. 4 will be described. FIG. 7 is a sequence diagram of the modified example of the second optical pickup control process of FIG. 4. The modified example is different from the second optical pickup control process described above with reference to FIG. 4 in that when a fine search is performed during the seek operation of the optical pickups 108 and 112, the optical pickups 108 and 112 are in synchronization with each other to individually perform the fine search.

In FIG. 7, first, the DSP 126 of the optical disc drive apparatus 100 receives the seek command from the host 200 via the FPGA 136 (Step S702).

Next, the DSP 126 performs a seek request to the DSP 132 via the FPGA 134 for acquiring synchronization between channels A and B (Step S704).

Next, the DSP 132 performs a response to the seek request to the DSP 132 via the FPGA 134 (Step S706).

Next, the DSP 126 performs a fine search start request to the DSP 132 via the FPGA 134 (Step S708). Here, the DSP 126 notifies the DSP 132 of the number of tracks of the fine search to be performed next along with the fine search start request.

Next, the DSP 126 transmits a control signal for the fine search to the driver 124 and the sled driver 120. The sled driver 120 operates the sled motor 118 on the basis of the control signal transmitted from the DSP 126. In addition, the sled motor 118 causes the optical pickups 108 and 112 to slide for the fine search by driving the sled mechanism 116. On the other hand, the driver 124 causes the optical pickup 108 to perform the fine search by operating the actuator (not shown) on the basis of the control signal transmitted from the DSP 126 (Step S710). Here, the fine search is, as illustrated in FIG. 5, a control for accurately searching the optical disc 102 from the current address AD1a to the address AD2a of the remaining ±N track near the target address ADTa.

On the other hand, the DSP 132 transmits a control signal for the fine search corresponding to the number of tracks notified in Step S708 to the driver 130 in synchronization with the DSP 126. The driver 130 causes the optical pickup 112 to perform the fine search by operating the actuator (not shown) on the basis of the control signal transmitted from the DSP 132 (Step S712). Here, the fine search is a control for accurately searching the optical disc 102 from the current address AD2b (not shown) to the address AD2b of the remaining ±N track near the target address ADTb (not shown).

Next, the DSP 126 performs a track jumping request to the DSP 132 via the FPGA 134 (step S714).

Next, the DSP 126 transmits a control signal for a track jumping to the target address ADTa illustrated in FIG. 5 to the driver 124. The driver 124 causes the optical pickup 108 to perform the track jumping to the target address ADTa by operating the actuator (not shown) on the basis of the control signal transmitted from the DSP 126 (Step S716). Accordingly, the optical pickup 108 can cause a beam spot to illuminate a track of the target address ADTa.

On the other hand, the DSP 132 transmits a control signal for a track jumping to the target address ADTb (not shown) to the driver 130. The driver 130 causes the optical pickup 112 to perform the track jumping to the target address ADTb by operating an actuator (not shown) on the basis of the control signal transmitted from the DSP 132 (Step S718). Accordingly, the optical pickup 112 can cause a beam spot to illuminate a track of the target address ADTb.

According to the modified example of the second optical pickup control process of FIG. 7, on the optical disc drive apparatus 100 having the two optical pickups 108 and 112, in the case where the DSP 126 of the optical pickup 108 receives the seek command, when the fine search is performed, the two optical pickups 108 and 112 are in synchronization with each other to perform the fine search, so that the slide control of the sled mechanism 116 becomes stable. When the slide control of the sled mechanism 116 becomes stable, a seek operation can be performed stably and at high speed. Therefore, in the case where the two optical pickups 108 and 112 are mounted in the single sled mechanism 116, the seek operation can be performed stably and at high speed.

Moreover, in the modified example of the second optical pickup control process of FIG. 7, the DSP 126 receives the seek command. However, in the case where the DSP 132 receives the seek command, before the above-mentioned Step S702, the DSP 132 performs a seek request to the DSP 126 via the FPGA 134. In addition, the DSP 126 performs a response to the seek request to the DSP 132 via the FPGA 134. Thereafter, the DSPs 126 and 132 perform the process after the above-mentioned Step S702, thereby exhibiting the same effect as that of the modified example of the second optical pickup control process of FIG. 7.

The purpose of the invention is also achieved by supplying a recording medium which records program codes of software for implementing the functions of the above-described embodiments to a system or an apparatus and reading out and executing the program codes stored in the recording medium by a computer (or a CPU, an MPU, or the like) of the system or the apparatus.

In this case, the program codes read out from the recording medium implement the functions of the above-described embodiments, so that the program codes and the recording medium which records the program codes make up the invention.

In addition, as the recording medium for supplying the program codes, for example, floppy (registered trademark) disks, hard disks, magneto-optical disks, optical discs such as CD-ROM, CD-R, CD-RW, DVD-ROM, DVD-RAM, DVD-RW, and DVD+RW, magnetic tapes, non-volatile memory cards, ROMs, and the like may be used. In addition, the program codes may be downloaded via networks.

In addition, a case where the functions of the above-described embodiments are implemented not only by executing the program codes read out by the computer, but also by executing a part of or the entire practical process using an OS (operating system) or the like operated in the computer on the basis of an instruction of the program codes may be included.

Moreover, a case where the functions of the above-described embodiments are implemented by writing the program code read out from the recording medium to a function expansion board inserted into the computer or a memory included in a function expansion unit connected to the computer, and performing the expanded function as a part or the entire practical process by the function expansion board or the CPU included in the expansion unit on the basis of an instruction of the program codes may be included.

The present application contains subject matter related to that disclosed in Japanese Priority Patent Application JP 2009-290694 filed in the Japan Patent Office on Dec. 22, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc drive apparatus comprising:
   a first optical pickup and a second optical pickup which record data on an optical disc and reproduce data recorded on the optical disc;
   a slide mechanism which has the first and second optical pickups mounted thereon to slide the first and second optical pickups in a radial direction of the optical disc;
   a seek command receiver which receives a seek command;
   a first optical pickup controller which causes the first optical pickup to perform a search on the basis of the seek command;
   a slide mechanism controller which controls the slide mechanism on the basis of the seek command; and
   a second optical pickup controller which turns off a tracking servo of the second optical pickup when the first and second optical pickups are slid by the slide mechanism.

2. The optical disc drive apparatus according to claim 1, wherein the first optical pickup controller causes the first optical pickup to perform a first search by turning off a tracking servo of the first optical pickup and thereafter causes the first optical pickup to perform a second search by turning on the tracking servo of the first optical pickup on the basis of the seek command.

3. The optical disc drive apparatus according to claim 1, wherein the first optical pickup controller causes the first optical pickup to perform a search by turning on the tracking servo of the first optical pickup on the basis of the seek command.

4. An optical disc drive apparatus comprising:
a first optical pickup and a second optical pickup which record data on an optical disc and reproduce data recorded on the optical disc;
a slide mechanism which has the first and second optical pickups mounted thereon to slide the first and second optical pickups in a radial direction of the optical disc;
a seek command receiver which receives a seek command;
a first optical pickup controller which causes the first optical pickup to perform a search on the basis of the seek command;
a slide mechanism controller which controls the slide mechanism on the basis of the seek command;
a search request receiver which receives a search request; and
a second optical pickup controller which causes the second optical pickup to perform a search by turning on a tracking servo of the second optical pickup on the basis of the search request.

5. The optical disc drive apparatus according to claim 4, wherein the first optical pickup controller causes the first optical pickup to perform a first search by turning off a tracking servo of the first optical pickup and thereafter causes the first optical pickup to perform a second search by turning on the tracking servo of the first optical pickup on the basis of the seek command.

6. The optical disc drive apparatus according to claim 4, wherein the first optical pickup controller causes the first optical pickup to perform a search by turning on a tracking servo of the first optical pickup on the basis of the seek command.

7. The optical disc drive apparatus according to any one of claims 4 to 6, wherein the first and second optical pickup controllers simultaneously turn on the tracking servos of the first and second optical pickups.

8. An optical pickup control method comprising the steps of:
receiving a seek command;
controlling a first optical pickup for recording data on an optical disc or reproducing data recorded on the optical disc to perform a search on the basis of the seek command;
controlling a slide mechanism which has the first optical pickup and a second optical pickup mounted thereon to slide the first and second optical pickups in a radial direction of the optical disc on the basis of the seek command; and
controlling a tracking servo of the second optical pickup which is turned off when the first and second optical pickups are slid by the slide mechanism.

9. An optical pickup control method comprising the steps of:
receiving a seek command;
controlling a first optical pickup for recording data on an optical disc or reproducing data recorded on the optical disc to perform a search on the basis of the seek command;
controlling a slide mechanism which has the first optical pickup and a second optical pickup mounted thereon to slide the first and second optical pickups in a radial direction of the optical disc on the basis of the seek command;
receiving a search request; and
controlling the second optical pickup to perform a search by turning on a tracking servo of the second optical pickup on the basis of the search request.

10. A non-transitory computer-readable storage medium storing program code which, when executed by a computer, causes the computer to function as:
a seek command receiver which receives a seek command;
a first optical pickup controller which controls a first optical pickup for recording data on an optical disc or reproducing data recorded on the optical disc to perform a search on the basis of the seek command;
a slide mechanism controller which controls a slide mechanism that has the first optical pickup and a second optical pickup mounted thereon to slide the first and second optical pickups in a radial direction of the optical disc on the basis of the seek command; and
a second optical pickup controller which controls a tracking servo of the second optical pickup which is turned off when the first and second optical pickups are slid by the slide mechanism.

11. A non-transitory computer-readable storage medium storing program code which, when executed by a computer, causes the computer to function as:
a seek command receiver which receives a seek command;
a first optical pickup controller which controls a first optical pickup for recording data on an optical disc or reproducing data recorded on the optical disc to perform a search on the basis of the seek command;
a slide mechanism controller which controls a slide mechanism that has the first optical pickup and a second optical pickup mounted thereon to slide the first and second optical pickups in a radial direction of the optical disc on the basis of the seek command;
a search request receiver which receives a search request; and
a second optical pickup controller which controls the second optical pickup to perform a search by turning on a tracking servo of the second optical pickup on the basis of the search request.

12. The optical disc drive apparatus according to claim 1, wherein the first optical pickup controller turns off a tracking servo of the first optical pickup when the first and second optical pickups are slid by the slide mechanism.

13. The optical disc drive apparatus according to claim 1, wherein the second optical pickup controller turns on the tracking servo of the second optical pickup after receiving a request from the first optical pickup controller.

14. The optical disc drive apparatus according to claim 2, wherein the first optical pickup controller causes the first optical pickup to perform a third search interposed between the first search and the second search, the first optical pickup controller causes the first optical pickup to perform the third search when the tracking servo of the first optical pickup is turned off.

15. The optical disc drive apparatus according to claim 5, wherein the first optical pickup controller causes the first optical pickup to perform a third search interposed between the first search and the second search, the first optical pickup controller causes the first optical pickup to perform the third search when the tracking servo of the first optical pickup is turned on.

* * * * *